(12) United States Patent
Cappellotto

(10) Patent No.: US 7,451,521 B2
(45) Date of Patent: Nov. 18, 2008

(54) APPARATUS FOR REMOVAL OF MATERIAL BY SUCTION

(75) Inventor: Luigi Cappellotto, Gaiarine (IT)

(73) Assignee: Cappellotto S.p.A., Gaiarine (IT)

( * ) Notice: Subject to any disclaimer, the term of this patent is extended or adjusted under 35 U.S.C. 154(b) by 109 days.

(21) Appl. No.: 11/403,855

(22) Filed: Apr. 14, 2006

(65) Prior Publication Data

US 2006/0236499 A1    Oct. 26, 2006

(30) Foreign Application Priority Data

Apr. 21, 2005   (IT)   ............ PD2005A0110

(51) Int. Cl.
     *A47L 5/00*      (2006.01)
(52) U.S. Cl. ............ 15/340.1; 15/352; 15/347
(58) Field of Classification Search ......... 15/340.1, 15/347, 252; 55/307, 334; 298/9–12, 17.5, 298/17.8, 24, 25
See application file for complete search history.

(56) References Cited

U.S. PATENT DOCUMENTS

| | | | |
|---|---|---|---|
| 2,621,072 A * | 12/1952 | Sherburne ............... 298/9 |
| 4,017,281 A | 4/1977 | Johnstone et al. |
| 4,193,159 A * | 3/1980 | Beard, III ............... 15/340.1 |
| 4,227,893 A * | 10/1980 | Shaddock ............... 95/268 |
| 4,659,262 A * | 4/1987 | van Aalst ............... 406/29 |
| 4,935,984 A * | 6/1990 | Bryant et al. ............ 15/302 |
| 5,596,788 A * | 1/1997 | Linville et al. ........... 15/352 |
| 5,996,171 A * | 12/1999 | Bowers ............... 15/340.1 |
| 6,752,467 B1 | 6/2004 | Palrose et al. |

FOREIGN PATENT DOCUMENTS

GB    809 154 A    2/1959
GB    2 000 107 A    1/1979

OTHER PUBLICATIONS

Patent Abstracts of Japan vol. 010, No. 070 (M-462), Mar. 19, 1986—& JP 60 213532 A (Kayaba Kogyo KK), Oct. 25, 1985 *the whole document*.

* cited by examiner

*Primary Examiner*—Dung Van Nguyen
(74) *Attorney, Agent, or Firm*—Modiano & Associati; Albert Josif; Daniel J. O'Byrne

(57) ABSTRACT

An apparatus for removal of material by suction, comprising, supported by the chassis of a truck, a partial vacuum unit for a collection tank, to which aspirated material is conveyed. The tank is fitted on an unloading device suitable to lift on one side the tank in order to empty by gravity the material accumulated therein. The unloading device comprises a frame rotatably coupled to the chassis by interposing a rotatable center bearing, provided with an actuation for actuating the rotation of the frame with-respect to the chassis. The frame has a base for connection to the center bearing, and a supporting structure for the tank is associated with the base. The structure is adapted for multiple movements for positioning and unloading the tank outside of the truck footprint.

14 Claims, 5 Drawing Sheets

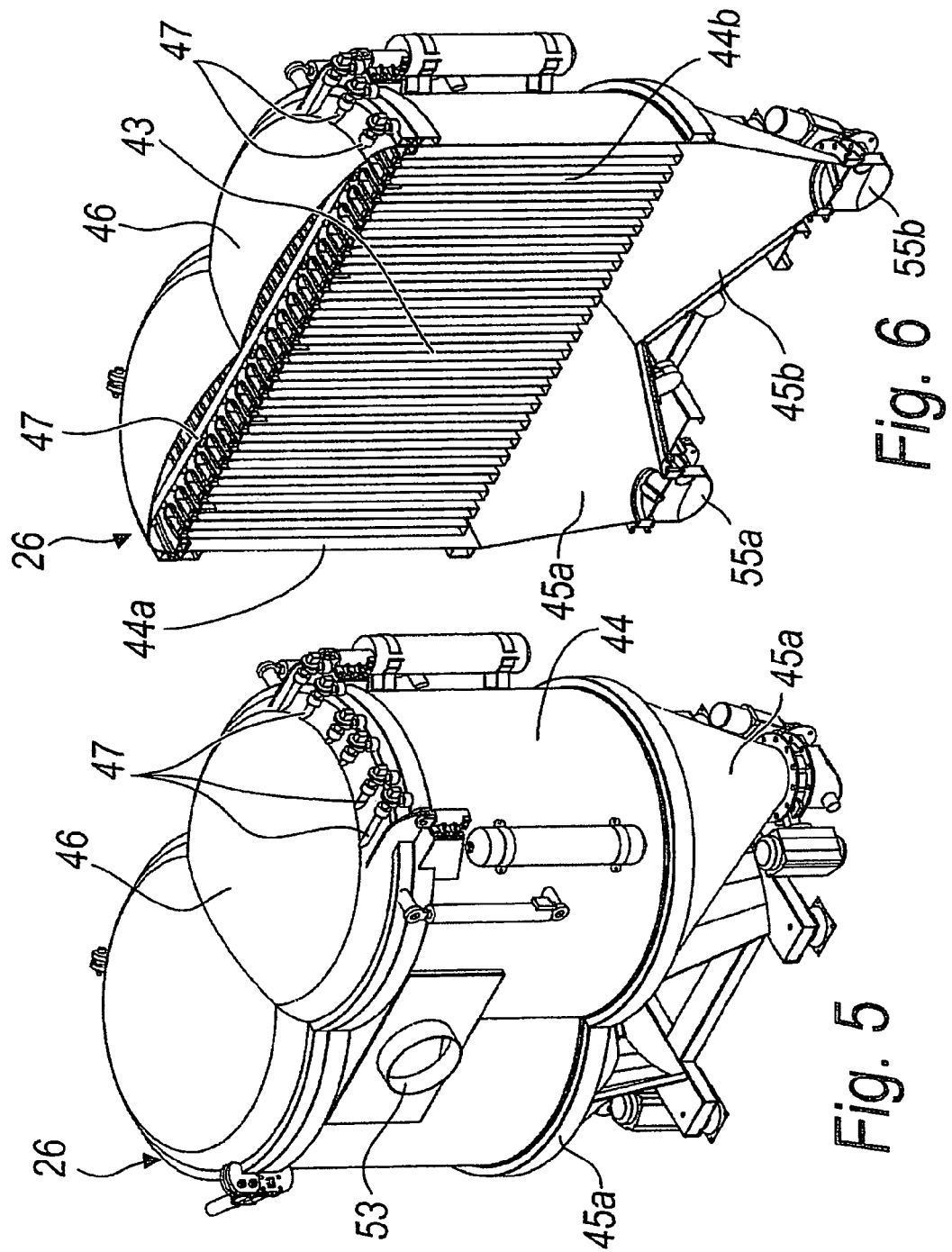

APPARATUS FOR REMOVAL OF MATERIAL BY SUCTION

The present invention relates to an apparatus for removal of material by suction, particularly of soil, and in general material from excavations.

The invention also relates to a filtration device devised particularly for apparatuses for removing soil by suction.

The invention also relates to a truck with an onboard apparatus for removal by suction, particularly of soil.

BACKGROUND OF THE INVENTION

Restoration and maintenance work is currently increasingly frequent, particularly in the historical centers of cities and towns, in the field of civil building and of municipal networks for supplying water, gas and power, both for protecting buildings and for servicing public utilities, such as gas pipelines, water pipelines and electrical grids.

This work requires very delicate excavation activities, since it is performed in ground which is already crossed by working pipes and cables, which therefore must absolutely be preserved against damage and failure.

Other work requiring similar precision and delicateness in operation is constituted for example by excavations in the vicinity of roots of plants or in regions crossed by rail tracks.

Other work requiring particular flexibility and precision in operation is work performed in underground spaces, which cannot be accessed by excavation vehicles.

In order to remove the soil, but also liquids or mud, from the ground to be excavated, apparatuses for removal by suction, particularly of soil, are currently known which comprise, supported by the chassis of a means of transport, a partial vacuum unit for a collection tank, to which the aspirated material is conveyed by associated suction means.

Said tank is installed on unloading means, which are suitable to lift it on one side in order to empty it by gravity of the material accumulated therein.

The soil or dust, liquids, mud and other similar material, aspirated and deposited in the tank, are emptied, when the tank is full, into a dump body, which is removable from a vehicle chassis and is generally arranged to the rear of the means of transport of the tank, since the actuators that lift the tank to empty it tilt it so as to unload from the rear of the means of transport.

This position for unloading operations requires occupying a very large area, in which the means of transport of the tank and the chassis-mountable dump body must be arranged in a line.

If these operations for removing soil by suction occur in urban areas, they are often carried out in relatively constrained spaces, for which passage and parking is difficult for large motor vehicles, such as typically excavators and earth removal machines in general, as well as for trucks for carrying the dump bodies.

These apparatuses for removing soil, mud and the like by suction are generally provided with a filtration device, which is constituted by a box-like body with a tapering bottom for collecting the filtrate and an upper lid.

Filtering shell-and-tube assemblies, covered at least partially with dust retention sleeves, or other filtering elements, depending on whether one has to filter soil, liquids or mud, are arranged within the box-like body.

The box-like body is conveniently cylindrical, i.e., has the shape that best withstands the stresses imposed by the partial vacuum generated inside it.

Said cylindrical shape of the body of the filtration device, however, causes considerable space occupation, especially in the longitudinal direction of the means of transport.

The width of such a filtration device in fact entails an equal length, since it is a cylindrical body, consequently reducing, on board the means of transport, the space available for the suction means and the collection tank.

SUMMARY OF THE INVENTION

The aim of the present invention is to provide an apparatus for removal by suction, particularly of soil, which solves the drawbacks revealed by known apparatuses.

Within this aim, an object of the present invention is to provide a filtration device particularly for apparatuses for removal by suction, particularly of soil, which has an increased capacity and reduced space occupation with respect to known filtration devices.

Another object of the present invention is to provide a truck which has on board an apparatus for removal by suction, particularly of soil.

Another object of the present invention is to provide an apparatus which allows higher flexibility in operations for unloading the tank.

A further object of the present invention is to provide an apparatus which allows to unload the tank also on the sides of the means of transport as well as from the back.

Another object of the present invention is to provide an apparatus which can operate in confined spaces and no less efficiently than known types of apparatus.

Another object of the present invention is to provide an apparatus which has a suction capacity at least equal to that of known apparatuses.

Another object of the present invention is to provide an apparatus which can be managed easily even by an operator who does not have particular prior training.

Another object of the present invention is to provide an apparatus for removing soil by suction, a filtration device, and a truck on board of which there is an apparatus for removal by suction, particularly of soil, which can be manufactured with known systems and technologies.

This aim and these and other objects, which will become better apparent hereinafter, are achieved by an apparatus for removal by suction, particularly of soil, of the type that comprises, supported by the chassis of a means of transport, a partial vacuum unit for a collection tank, to which the aspirated material is conveyed by associated suction means, said tank being fitted on unloading means which are suitable to lift on one side said tank in order to empty it by gravity of the material accumulated therein, said apparatus being characterized in that said unloading means comprise a frame which is rotatably coupled to said chassis by interposing a center bearing, which rotates about a vertical axis and is provided with means for actuating the rotation of the frame with respect to the chassis, said frame having a base for connection to the center bearing, a supporting structure for said tank being associated with said base, said structure having multiple movement means for positioning the tank and unloading it outside of the footprint of the means of transport.

Advantageously, a filtration device for apparatuses for removal of material by suction, particularly of soil, of the type constituted by a box-like body with a tapering bottom for collecting the filtrate and an upper lid, inside which shell-and-tube assemblies at least partially covered by dust retention sleeves are arranged, is characterized in that said box-like body is shaped like two cylinders which have vertical and parallel axes and partially intersect each other, so as to form two cylindrical filtration compartments, which open laterally one inside the other and are each provided, in a lower region, with a conical bottom for collecting the filtrate.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 5 is a perspective view of a filtration device according to the invention;

FIG. 6 is a sectional perspective view of a filtration device according to the invention;

DESCRIPTION OF THE PREFERRED EMBODIMENTS

Figure 1:
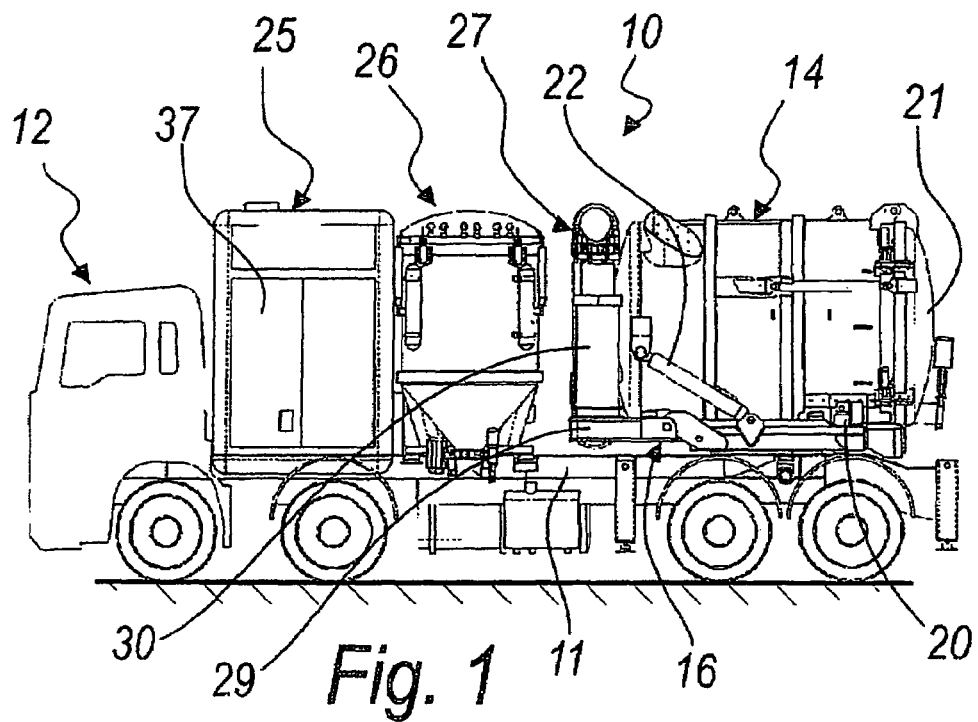
FIG. 1 is a side view of a truck on board of which there is an apparatus according to the invention in its basic configuration.

With reference to the figures, an apparatus for removal of material by suction, particularly of soil, according to the invention, is generally designated by the reference numeral 10.

The apparatus 10 comprises, supported by the chassis 11 of a means of transport 12, a partial vacuum unit 25 for a collection tank 14, to which the aspirated material is conveyed by associated suction means, described in greater detail hereinafter.

The tank 14 is substantially cylindrical and is closed by two bottoms, one of which, the unloading bottom 21, can be opened during the step for emptying the tank 14.

The bottoms have a conveniently cambered shape.

The cylindrical shape of the tank 14 and the cambered shape of the bottoms that close it are such as to prevent the implosion of the tank 14 as a consequence of the stresses imposed by the substantial partial vacuum generated therein by the partial vacuum unit 25 for suction.

The tank 14 is installed on unloading means, which are suitable to lift it at one end in order to allow its emptying by gravity of the material accumulated therein.

The tank 14 is generally suitable to unload onto a dump body 50, of the type that can be removed from a chassis, by means of which the soil aspirated in the tank 14 is moved away from the work area.

The unloading means comprise a frame 16, which is coupled rotatably to the chassis 11 by interposing a center bearing 17, which rotates about a vertical axis and is provided with means for actuating the rotation of the frame 16 with respect to the chassis 11.

The frame 16 in turn is composed of a base 18 for connection to the center bearing 17.

A supporting structure 19 for the tank 14 is associated with the base 18.

The structure 19 has multiple movement means for positioning the tank 14, so that it discharges outside the footprint of the means of transport 12.

Said multiple movement means comprise two first actuators 20.

The first actuators 20 are arranged between the structure 19 and the base 18 in order to lift the structure 19 with respect to the base 18 on the side of the unloading bottom 21 of the tank 14, in order to raise the bottom 21 so that it lies above the edge of the adjacent dump body 50.

On the opposite side with respect to the first actuators 20, the structure 19 is connected to the base 18 by way of pivoting means, constituted here by two pivots 49.

The multiple movement means further comprise second actuators 22, which are interposed between the structure 19 and the opposite part of the tank 14 with respect to the openable bottom 21.

Figure 4:
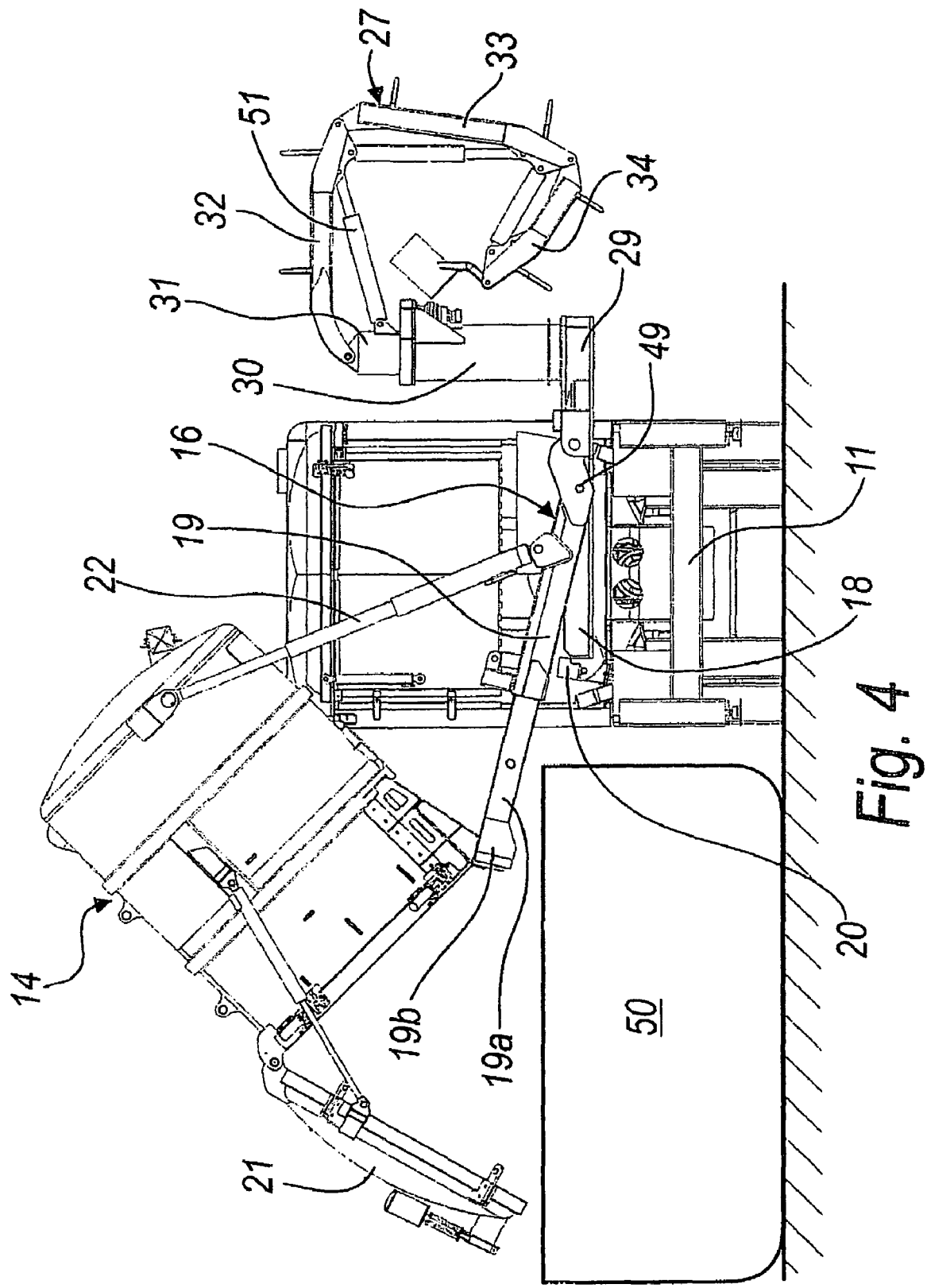
FIG. 4 is a rear view of the truck with an apparatus according to the invention in the tipped unloading configuration.
Figure 7:
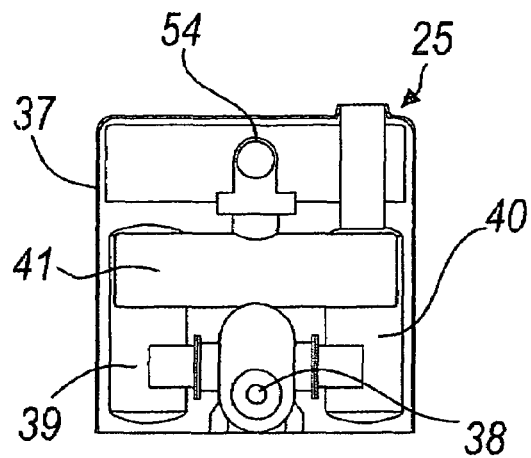
FIG. 7 is a front view of a partial vacuum unit for an apparatus according to the invention.
Figure 8:
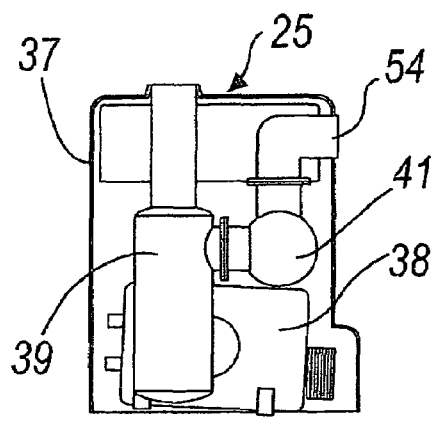
FIG. 8 is a side view of a partial vacuum unit for an apparatus according to the invention.
Figure 9:
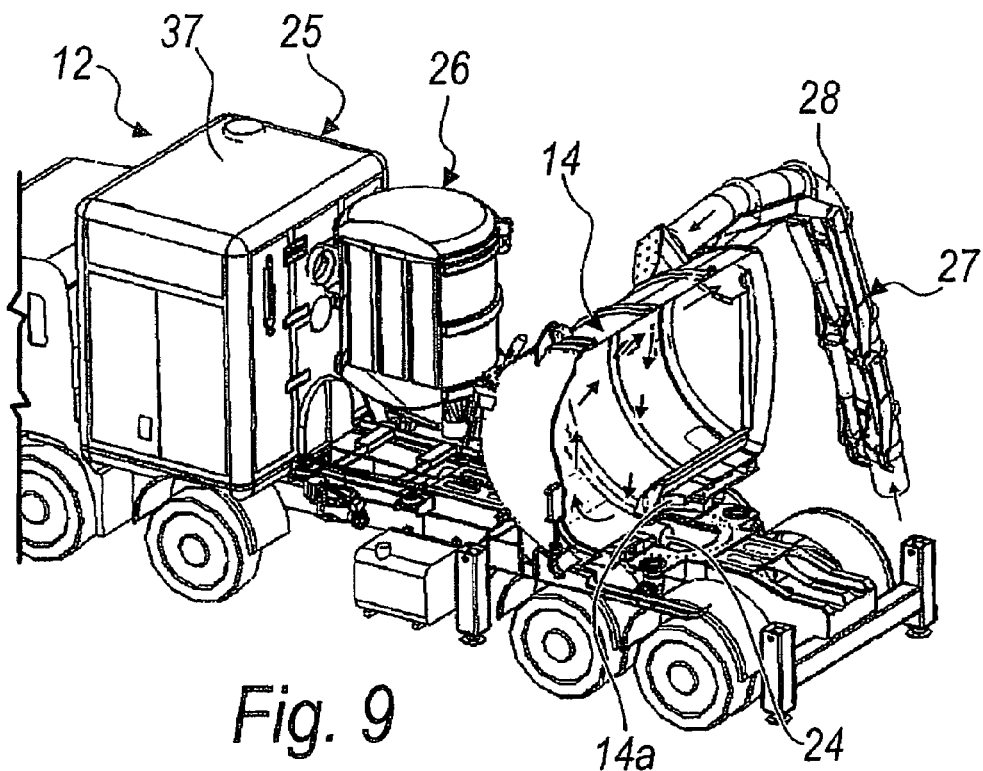
FIG. 9 is a perspective view of a truck according to the invention, with the tank shown in cross-section so as to illustrate the path of the air aspirated by the partial vacuum unit.

The second actuators 22 are adapted to tilt the tank 14 to unload it into the dump body 50, as exemplified in FIG. 4.

Figure 2:
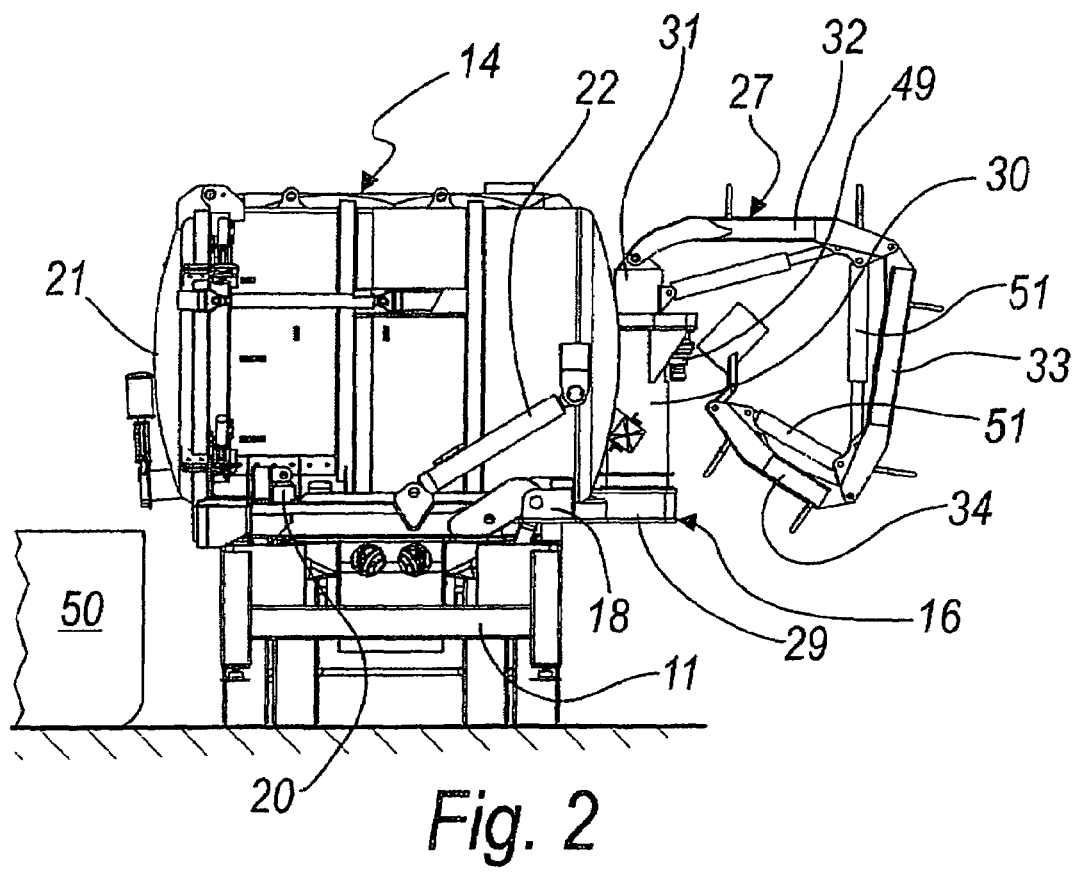
FIG. 2 is a rear view of the truck with the apparatus in a lateral unloading configuration.

FIG. 4 also shows that the extension of the first actuators 20 allows the structure 19 to tilt so that the openable unloading bottom 21 is arranged for unloading above the dump body 50, even if the dump body 50 has sides which are higher than the distance from the ground of the lower part of the tank 14 in the basic operating configuration, as exemplified in FIG. 2.

The multiple movement means are completed by two telescopic arms 19a of the structure 19.

The telescopic arms 19a are joined at their ends by a cross-member 19b, to which the tank 14 is pivoted proximate to its unloading bottom 21.

The arms 19a can be extended/retracted by way of fluid-operated actuation means or other equivalent means which can extend from complementarily shaped receptacles of the structure 19.

The arms 19a are suitable to move the tank 14 away from the volume occupied by the means of transport 12, as shown in FIG. 4.

The center bearing 17 has an axial hole 23 for the passage of the couplings between the suction port 14a of the tank 14 with underlying suction ducts 24.

The means for actuating the rotation of the frame 16 with respect to the chassis 11 are constituted by a motor drive, which is not shown for the sake of simplicity.

The center bearing 17 allows the tank 14 to rotate through at least 180° about the vertical axis of the center bearing.

In this manner, the tank 14 can be arranged, for the unloading operations, in a chosen point within the rotation arc, and particularly in the lateral and rear regions of the means of transport 12 that supports it.

Figure 3:
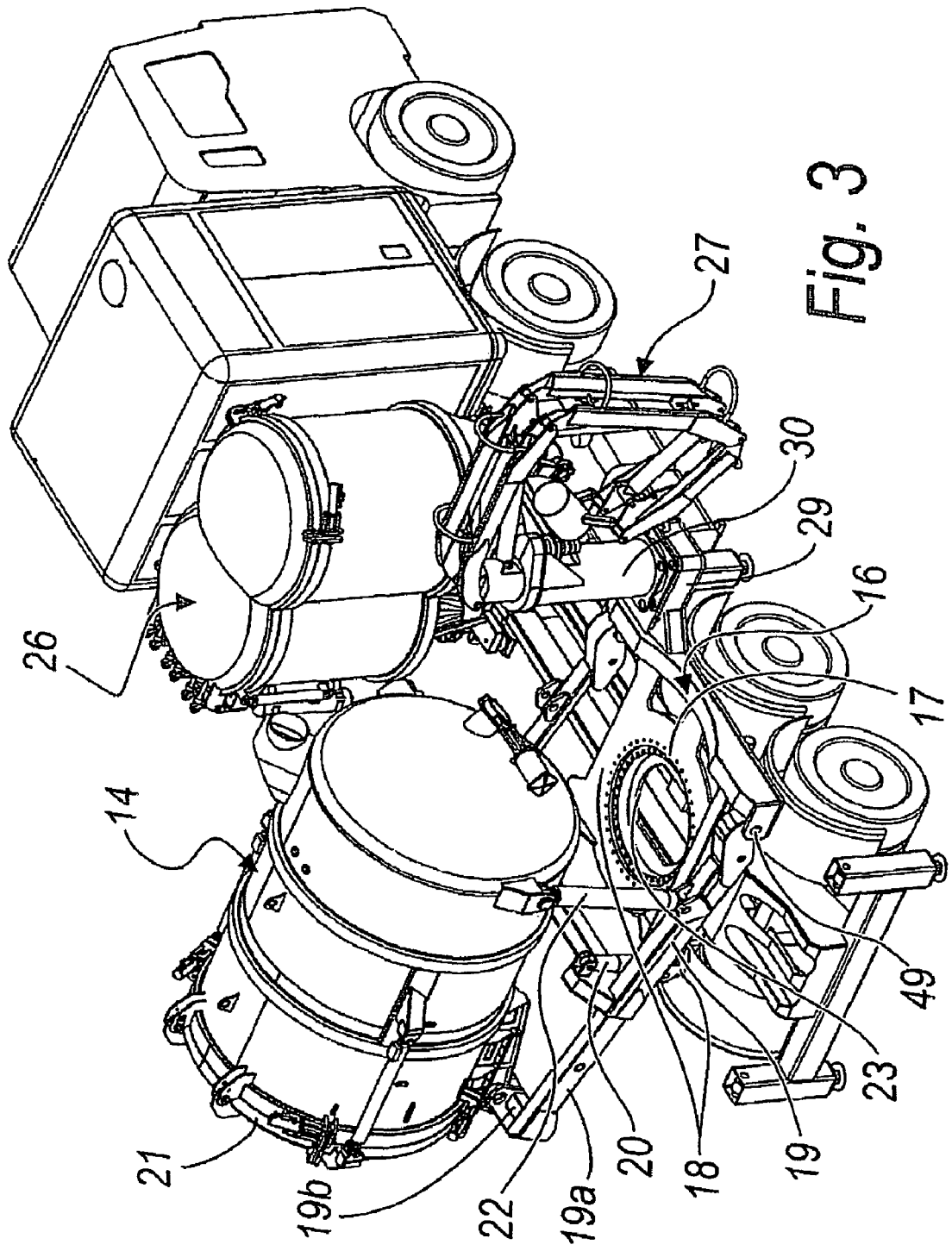
FIG. 3 is a perspective view of an apparatus according to the invention, with the collection tank in the raised configuration.

The possibility to unload into a dump body 50 which is arranged laterally to the apparatus 10 (and therefore laterally to the means of transport 12), as exemplified in FIGS. 2, 3 and 4, allows to perform operations for emptying the tank 14 in all urban and non-urban areas in which there is no space behind the means of transport to arrange thereat a dump body 50.

The suction means cited above are formed by an articulated arm 27 for supporting and positioning a suction tube 28.

The articulated arm 27 is rigidly coupled to the supporting structure 19 of the tank 14 and is fixed to a bracket 29 which protrudes from the structure 19.

The articulated arm 27 is therefore also orientable by means of the center bearing 17; i.e., by turning the frame 16 to which the bracket 29 belongs, the arm 27 can be arranged so as to work in any point of the arc allowed by the center bearing 17.

In the embodiment of the invention described here by way of non-limiting example, the articulated arm 27 is composed of a turret 30, which is fixed to the bracket 29, the head 31 of which can rotate about an axis which is perpendicular to the ground.

A plurality of consecutive and mutually articulated tube guiding sectors 32, 33 and 34 are hinged from the head 31 and support the tube 28.

The rotation of the head 31 with respect to the turret 30 is actuated and controlled by means of a motor drive 49, while the tube guiding sectors 32, 33 and 34 can be moved with respect to a consecutive member by way of additional actuation cylinders 51.

The partial vacuum unit 25 comprises, within a sound-absorbing cabinet 37, a pump 38 provided in input with a pump protection filter 41 and with a first muffler 39, and in output with a second muffler 40.

Such a partial vacuum unit is capable of working in an urban environment without causing particular noise pollution.

The apparatus 10 according to the invention, thus described by way of non-limiting example, is suitable for aspirating not only soil but also all the various materials produced by excavations, such as mud, liquids, dust or other debris.

The partial vacuum unit 25 is suitable to aspirate from the tank 14 with the interposition of a filtration device 26, which is functionally connected to the tank 14 by way of the suction ducts 24.

The filtration device 26 is of the type constituted by a box-like body 44 with a tapering bottom for collecting the filtrate and an upper lid 46, inside which there are shell-and-tube assemblies 43 which are at least partially covered by dust retention sleeves.

The device 26, to which the present invention also relates, is characterized in that the box-like body 44 is shaped like two cylinders with vertical and parallel axes, which partially intersect each other so as to form two cylindrical filtration compartments 44a and 44b which open laterally into each other.

Said shape of the body 44 allows, for an equal longitudinal space occupation (with respect to the length of the means of transport 12) with a filtration device of the known single-cylinder type, a larger volume which can be fitted with shell-and-tube assemblies for filtration.

The filtration device 26 according to the invention therefore has a higher filtration capacity than known types of filtration device having a cylindrical body.

The two cylindrical compartments 44a and 44b are each provided, in a lower region, with a conical bottom, designated respectively by the reference numerals 45a and 45b, for collecting the filtrate.

Known devices also have a conical bottom, but the two conical bottoms 45a and 45b arranged side-by-side have lateral surfaces which are more inclined than the single central conical bottom of known devices, consequently improving the sliding of the filtrate toward the underlying discharges.

The aspirated air that arrives from the ducts 24 enters the lower ports, not shown for the sake of simplicity, of the conical bottoms 45a and 45b, and flows out toward the partial vacuum unit 25 from the upper port 53.

The upper port 53 is connected directly to the intake 54 of the partial vacuum unit, which leads to the pump protection filter 41.

A plurality of tubular blowers 47 are provided between the shell-and-tube assemblies 43 and the lid 46 and are suitable to blow air in countercurrent onto the shell-and-tube assemblies 43 and onto the sleeves that surround them, in order to clean the device periodically.

The outlets 55a and 55b are visible at the end of the conical bottoms 45a and 45b and the filtrate accumulated therein is extracted periodically through said outlets.

The filtration device 26 can be adopted for an apparatus 10 which aspirates earth, solid and muddy debris, and, if modified adequately, even liquids.

The invention also relates to a truck provided with an apparatus for removal by suction particularly of soil.

Said truck, i.e., the means of transport designated above by the reference numeral 12, therefore comprises, supported by its chassis 11, a partial vacuum assembly 25 for a collection tank 14, to which the aspirated material is conveyed by suction means as described above.

The tank 14 is installed on unloading means suitable to lift the tank 14 at one end in order to empty it.

The truck 12 is characterized in that the unloading means are constituted by a frame 16 which is coupled rotatably to the chassis 11 by interposing a center bearing 17, which rotates about a vertical axis and is provided with means for actuating the rotation of the frame 16 with respect to the chassis 11.

In accordance with what has been described above, the frame 16 has a base 18 for connection to the center bearing 17; a structure 19 for supporting the tank 14 is associated with the base 18.

The structure 19 is connected to the base 18 at one end by virtue of pivoting means, on the opposite side by virtue of first actuators 20, which are suitable to lift the part of the structure 19 on which the tank 14 is directed with its openable unloading bottom 21.

The tank 14 is moved, with respect to the structure 19 that supports it, by second actuators 22, which are interposed between the structure 19 and the opposite part of the tank 14 with respect to the openable unloading bottom 21.

The second actuators 22 are suitable to tilt the tank 14 to unload it.

The partial vacuum unit 25 on board the truck 12 is suitable to aspirate from the tank 14 with the interposition of a filtration device 26 functionally connected to the tank 14 by way of the suction ducts 24.

The suction means provided on the truck 12 are formed by an articulated arm 27 for supporting and positioning a suction tube 28 for soil or other generic materials produced by excavations, such as mud, liquids, dust or other debris.

The truck 12 is provided with a partial vacuum unit 25 and with a filtration device 26 as described above.

In practice it has been found that the invention thus described solves the problems noted in known types of apparatus for removal by suction, particularly of soil or materials produced by excavations, such as mud, liquids, dust or other debris.

In particular, the present invention provides an apparatus which allows higher flexibility in the operations for unloading the tank.

Moreover, the present invention provides an apparatus which allows to unload the tank also on the sides of the means of transport as well as from the rear as in known apparatuses.

Further, the present invention provides a filtration device for apparatuses for removal by suction, particularly of soil, which has an increased capacity and reduced space occupation with respect to known filtration devices.

Moreover, the present invention provides a truck with an onboard apparatus for removal of material by suction, particularly of soil.

Further, the present invention provides an apparatus which can operate in confined spaces and at least as efficiently as known types of apparatus, and has a suction capacity at least equal to that of known apparatuses.

Further, the present invention provides an apparatus which can be managed easily even by an operator who lacks particular prior training.

Moreover, the present invention provides an apparatus for removal by suction, particularly of soil, a filtration device, and a truck with an onboard apparatus for removal by suction, particularly of soil, which can be manufactured with known systems and technologies.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2005A000110 from which this application claims priority are incorporated herein by reference.

What is claimed is:

1. An apparatus for removal of material by suction, comprising: a partial vacuum unit and a collection tank which are supported by a chassis of a means of transport; suction means associated to said collection tank to convey material aspirated by said vacuum unit from said tank; unloading means on which said tank is fitted and which are suitable to lift on a first side said tank to empty by gravity material accumulated therein through an openable unloading bottom of the tank arranged at a second side of said tank opposite said first side of said tank, and wherein said unloading means comprise: a center bearing, which rotates about a vertical axis; a frame which is rotatably coupled to said chassis by interposition of said center bearing, said center bearing being provided with actuation means for actuating rotation of the frame with respect to the chassis, said frame having a base for connection to the center bearing; a supporting structure for said tank being associated with said base, said structure having multiple movement means for positioning and unloading the tank outside of a footprint of the means of transport, said unloading means comprising actuators which are interposed between said structure and said first side of said tank, and said multiple movement means of said structure comprising telescopic arms and a cross-member of the structure which connects ends of said arms and to which said second side of said tank is pivotally, and fluid-operated actuation means by way of which said telescopic arms are extendable/retractable to move said second end of said tank away/toward a spaced occupation of the means of transport.

2. The apparatus of claim 1, wherein said tank has a suction opening and underlying suction ducts, said center bearing having an axial hole for passage of couplings between said suction opening and the suction ducts.

3. The apparatus of claim 2, comprising a filtration device, said partial vacuum unit being suitable to aspirate from said tank by interposition of said filtration device, which is connected functionally to said tank by way of said suction ducts.

4. The apparatus of claim 1, wherein said actuation means for actuating rotation of the frame with respect to the chassis are formed by a gearmotor.

5. The apparatus of claim 4, wherein said center bearing allows rotation of the tank through an arc of at least 180°, so that the tank is positioned, for unloading operations, in a chosen point within a rotation arc and in particular in lateral and rear regions of the means of transport that carries the tank.

6. The apparatus of claim 1, wherein said suction means are formed by an articulated arm for supporting and positioning a suction tube.

7. The apparatus of claim 6, wherein said articulated arm is rigidly coupled to said supporting structure of the tank by way of a bracket which protrudes from said structure.

8. The apparatus of claim 7, wherein said articulated arm is composed of a turret, which is fixed to the bracket, a head of the bracket being rotatable about an axis which is perpendicular to the ground, and wherein a plurality of mutually articulated consecutive tube guiding sectors are provided articulated from said head.

9. The apparatus of claim 1, further comprising a filtration device, said filtration device comprising a box-like body with a tapering bottom for collecting filtrate and an upper lid; two shell-and-tube assemblies which are accommodated in said box-like body and are at least partially covered by dust retention sleeves; and wherein said box-like body is shaped as a two-cylinder body, with the cylinders having vertical and parallel axes and partially mutually intersecting so as to form two cylindrical filtration compartments which open laterally into each other and are each provided, in a lower region, with a conical bottom for collecting the filtrate.

10. An apparatus for removal of material by suction, comprising: a partial vacuum unit and a collection tank which are supported by a chassis of a means of transport; suction means associated to said collection tank to convey material aspirated by said vacuum unit from paid tank; unloading means on which said tank is fitted and which are suitable to lift on one side said tank to empty by gravity material accumulated therein, and wherein said unloading means comprise; a center bearing, which rotates about a vertical axis; a frame which is rotatably coupled to said chassis by interposition of said center bearing, said center bearing being provided with actuation means for actuating rotation of the frame with respect to the chassis, said frame having a base for connection to the center bearing; a supporting structure for said tank being associated with said base, said structure having multiple movement means for positioning and unloading the tank outside of a footprint of the means of transport, said multiple movement means of said structure being constituted by first actuators, which are arranged between said structure and said base, in order to lift said structure with respect to the base on a side of an openable unloading bottom of the tank, in order to raise the openable unloading bottom so as to lie above a rim of an adjacent dump body, said structure comprising pivoting means and being connected to said base, on an opposite side with respect to said first actuators, by way of said pivoting means, second actuators, which are interposed between said structure and an opposite part of the tank with respect to the openable unloading bottom, said second actuators being suitable to tilt the tank for unloading thereof into the dump body;

telescopic arms and a cross-member of the structure which connects ends of said arms, away from a space occupation of the means of transport, the arms being suitable to move the tank, which is pivoted proximate to the openable unloading bottom to the cross-member; and fluid-operated actuation means by way of which said telescopic arms are extendable/retractable.

11. An apparatus for removal of material by suction, comprising: a partial vacuum unit and a collection tank which are supported by a chassis of a means of transport; suction means associated to said collection tank to convey material aspirated by said vacuum unit from said tank: unloading means on which said tank is fitted and which are suitable to lift on one side said tank to empty by gravity material accumulated therein, and wherein said unloading means comprise: a center bearing, which rotates about a vertical axis; a frame which is rotatably coupled to said chassis by interposition of said center bearing, said center bearing being provided with actuation means for actuating rotation of the frame with respect to the chassis, said frame having a base for connection to the center bearing; a supporting structure for said tank being associated with said base said structure having multiple movement means for positioning and unloading the tank outside of a footprint of the means of transport, said partial vacuum unit comprising a sound-absorbing cabinet, a pump which is provided in said cabinet and has in input a filter for protecting the pump and a first muffler and, in output, a second muffler.

12. An apparatus for removal of material by suction, comprising: a partial vacuum unit and a collection tank which are supported by a chassis of a means of transport; suction means associated to said collection tank to convey material aspirated by said vacuum unit from said tank; unloading means on which said tank is fitted and which are suitable to lift on one side said tank to empty by gravity material accumulated therein, and wherein said unloading means comprise; a center bearing, which rotates about a vertical axis; a frame which is rotatably coupled to said chassis by interposition of said center bearing said center bearing being provided with actuation means for actuating rotation of the frame with respect to the chassis, said frame having a base for connection to the center bearing; a supporting structure for said tank being associated with said base, said structure having multiple movement means for positioning and unloading the tank outside of a footprint of the means of transport, said filtration device comprising a box-like body with a tapering bottom for collecting filtrate and an upper lid; two shell-and-tube assemblies which are accommodated in said box-like to body and are at least partially covered by dust retention sleeves; and wherein said box-like body is shaved as a two- cylinder body, with the cylinders having vertical and parallel axes and partially mutually intersecting so as to form two cylindrical filtration compartments which open laterally into each other and are each provided, in a lower region, with a conical bottom for collecting the filtrate, said filtration device further comprising a plurality of tubular blowers provided between said shell-and-tube assemblies and said lid, said blowers being suitable to blow air in countercurrent onto said shell-and-tube assemblies and onto sleeves that surround the assemblies, in order to clean said device.

13. A truck and an apparatus for removal of material by suction, comprising a partial vacuum unit and a collection tank supported by a chassis; suction means for conveying material aspirated by said vacuum unit from said tank; unloading means on which said tank is installed, and which are suitable to raise at on one side said tank in order to empty by gravity the material that has accumulated therein, and wherein said unloading means constituted by a frame and a center bearing, said frame being coupled rotatablv to said chassis by interposition of said center bearing, which rotates about a vertical axis and is provided wit rotation means for actuating rotation of the frame with respect to the chassis; said frame further having a base for connection to the center bearing, a structure for supporting said tank associated with said base, first actuators, pivoting means, said structure being connected to said base at one side by way of said pivoting means and on an opposite side by way of said first actuators which are suitable to lift a part of said structure toward which the tank is directed with an openable unloading bottom, thereof, second actuators, which are interposed between said structure and an opposite part of the tank with respect to the openable unloading bottom, with said tank being moved with respect to said structure, which supports the tank, by said second actuators said second actuators being suitable to tilt the tank for unloading thereof;

a filtration device is provided which is functionally connected to said tank by way of suction ducts, said partial vacuum unit being suitable to aspirate from said tank by interposition of the filtration device;

said suction mean are formed b an articulated supporting and positioning arm for a suction tube, said partial vacuum unit comprising a pump located within a soundproofed cabinet and which is provided in input with a filter for protecting the pump and with a first muffler and in output with a second muffler.

14. The truck and apparatus of claim 13, wherein said filtration device is constituted by a box-like body with a tapering bottom for collecting filtrate and an upper lid, inside which shell-and-tube assemblies are provided at least partially covered by dust retention sleeves, and is shaped as a two-cylinder body, the two cylinders having vertical and parallel axes and partially intersecting each other so as to form two cylindrical filtration compartments which open laterally into each other and are each provided, in a lower region thereof, with a conical bottom for collecting the filtrate.

* * * * *